(12) United States Patent
Meyer-Guldner

(10) Patent No.: US 7,387,449 B2
(45) Date of Patent: Jun. 17, 2008

(54) COUPLING UNIT FOR COUPLING AN OPTICAL TRANSMITTING AND/OR RECEIVING MODULE TO AN OPTICAL FIBER CONNECTOR

(75) Inventor: Frank Meyer-Guldner, Berlin (DE)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/055,413

(22) Filed: Feb. 9, 2005

(65) Prior Publication Data
US 2006/0024003 A1  Feb. 2, 2006

Related U.S. Application Data

(60) Provisional application No. 60/592,437, filed on Jul. 30, 2004.

(51) Int. Cl.
*G02B 6/36* (2006.01)
(52) U.S. Cl. .............................. 385/88; 385/92; 385/93
(58) Field of Classification Search ..................... None
See application file for complete search history.

(56) References Cited

U.S. PATENT DOCUMENTS 5,388,171 A * 2/1995 Michikoshi et al. .......... 385/36
5,473,715 A * 12/1995 Schofield et al. ............. 385/53
5,526,455 A * 6/1996 Akita et al. .................... 385/93
6,536,959 B2 * 3/2003 Kuhn et al. .................... 385/93
6,567,223 B2 * 5/2003 Ludington ................... 359/811
6,793,406 B1 * 9/2004 Edwards et al. .............. 385/88
2001/0004414 A1 * 6/2001 Kuhn et al. .................... 385/93
2004/0062492 A1   4/2004 Bergmann et al.

FOREIGN PATENT DOCUMENTS

DE      102 46 532 A1    4/2004
JP        09258071 A  * 10/1997

\* cited by examiner

*Primary Examiner*—Sung H Pak
(74) *Attorney, Agent, or Firm*—Workman Nydegger

(57) ABSTRACT

A coupling unit for coupling an optical transmitting and/or receiving module to an optical fiber connector. The coupling unit has a connecting region, which can be connected to a transmitting and/or receiving module, a receiving region, which receives an optical fiber connector, and a glass component, via which light is coupled directly between an optical fiber inserted into the receiving region and a coupled-on transmitting and/or receiving module. In this case, the coupling unit is formed as a plastic part apart from the glass component. The glass component is introduced into a bore in the plastic part.

16 Claims, 1 Drawing Sheet

COUPLING UNIT FOR COUPLING AN OPTICAL TRANSMITTING AND/OR RECEIVING MODULE TO AN OPTICAL FIBER CONNECTOR

RELATED APPLICATION

The present application is claims priority of U.S. Patent Application Ser. No. 60/592,437 filed by Frank Meyer-Guldner on Jul. 30, 2004.

FIELD OF THE INVENTION

The invention relates to a coupling unit for coupling an optical transmitting and/or receiving module to an optical fiber connector. The coupling unit according to the invention is used in particular for coupling a laser diode or receiving diode arranged in a TO (Transistor Outline) package to a single-mode glass fiber.

BACKGROUND OF THE INVENTION

It is known to couple an optical fiber arranged in an optical connector to a transmitting and/or receiving module by means of a coupling unit. Light emerging from the optical fiber is thereby directed onto the photosensitive surface of a receiving element, in particular a photodiode, and/or light emitted by a transmitting element, in particular a laser diode, is coupled into the optical fiber.

In order to minimize reflections at the light-entering face or light-exiting face of the optical fiber, direct contact (physical contact) of the fiber core with an optical medium which has the same or a similar refractive index as the fiber core is advisable. In a fiber-air transition, for instance, reflections of the order of magnitude of −15 dB are produced. However, significantly better values of −27 dB are often required.

To realize such a physical contact, it is known to introduce into a coupling unit a glass fiber which is cemented into a precision ceramic pin. The one end face of the glass fiber serves as a stop face for the optical fiber of the optical connector to be coupled on. Light coupling with the transmitting and/or receiving module takes place via the other end face of the glass fiber. Among the applications for such configurations of a coupling unit are their use in optoelectronic transceivers that are produced and sold by Infineon Technologies AG under the designation "OC 48 SFF (P) transceiver".

However, such a coupling unit is relatively expensive to produce and requires a relatively high level of assembly effort. For instance, the end face of the glass fiber that comes into direct contact with the optical fiber of the optical connector must be of very good quality. The diameter of the ceramic pin into which the glass fiber is cemented must also be configured to within an accuracy of a few μm. A large number of high-precision, relatively expensive individual parts are required.

DE 102 46 532 A1 describes a coupling unit for coupling an optical transmitting and/or receiving module to an optical fiber, in which the coupling unit forms a connecting region, which can be connected to a transmitting and/or receiving module, and a receiving region, which receives an optical fiber. Formed between these regions, in a horizontally running base plate, is a transparent coupling region, which is an integral part of the coupling unit and, like the latter, consists of plastic. Via the coupling region of transparent plastic, light is coupled directly between an optical fiber inserted into the receiving region and a coupled-on transmitting and/or receiving module.

A disadvantage of this configuration is that a coupling region made of plastic is sensitive to damage, so that a required long lifetime of the coupling unit is not always obtained.

There is a need for a coupling unit for coupling an optical transmitting and/or receiving module to an optical fiber connector which is simple and inexpensive to produce and at the same time has a coupling region which is insensitive to damage.

SUMMARY OF THE INVENTION

The coupling unit according to the invention has a connecting region, which can be connected to a transmitting and/or receiving module, a receiving region, which receives an optical fiber connector, and a glass component, via which light is coupled directly between an optical fiber inserted into the receiving region and a coupled-on transmitting and/or receiving module. In this case, the coupling unit is formed as a plastic part, apart from the glass component. The glass component is introduced into a bore in the plastic part, in particular is cemented or pressed into it.

The use of a glass component for the light coupling has the effect of ensuring a high performance and resistance of the coupling unit. Since the coupling unit consists of plastic apart from the glass component, inexpensive and simple production is at the same time possible.

An optical fiber connector which is inserted into the receiving region of the coupling unit generally comprises a ferrule in which an optical fiber is centrally located. The ferrule with the optical fiber is inserted into the receiving region.

The glass component preferably lies against a stop of the plastic part. This allows accurate and highly precise positioning and alignment of the glass component in the plastic part.

In a preferred refinement, it is provided that the receiving region forms a bore for receiving an optical fiber connector and the bore for receiving the glass component axially adjoins the bore for receiving an optical fiber connector and at the same time preferably has a slightly smaller diameter than the latter. For example, the diameter of the bore for receiving the glass component is smaller than the diameter of the bore for receiving an optical fiber connector by 50 μm to 100 μm, in particular by approximately 100 μm. By providing a slightly smaller diameter of the bore for receiving the glass component in comparison with the bore for receiving an optical fiber connector, it is ensured that the bore for receiving an optical fiber connector cannot be damaged when the glass component is introduced and fastened.

The receiving region is preferably formed as an elongate sleeve with a precision bore, the end of which toward the connecting region is adjoined by the bore for receiving the glass component.

Arranging the glass component in a bore which directly adjoins the bore of the receiving region has the advantage of particularly high precision with respect to the alignment of the glass component. For instance, the end face of the glass component toward the receiving region has an extremely high degree of orthogonality in relation to the plugging axis of the coupling unit, since an optical fiber connector is inserted into a bore which runs coaxially in relation to the bore which receives the glass component. As a result, an extremely reliable physical contact is made possible between the end face of an optical fiber introduced into the receiving opening and the assigned end face of the glass component. A bore for the glass component which axially adjoins the bore of the receiving region can also be easily produced. During the injection-molding, the same mold insert that is used for the bore for receiving an optical fiber connector can also be used for this bore.

In principle, however, the bore for receiving the glass component may also be formed at a different location or with a different alignment in the plastic part. For example, it may alternatively be provided that the bore for receiving the glass component is located in an intermediate region between the receiving region and the connecting region and the glass component is pressed or cemented laterally into a bore or a press hole of such an intermediate region. In this case, the glass component may have a cuboidal form.

The production of the glass component may take place in a wide variety of ways. In a preferred and particularly inexpensive variant, the glass component is pressed out from a glass plate in a forming process after the glass plate has been heated.

For the purpose of precise positioning and securement of the glass component in the plastic part, at the end of the bore for receiving the glass component toward the connecting region, the plastic part forms a stop against which the glass component lies.

In one refinement, the glass component has a planar end face on the side facing the receiving region and likewise a planar end face on the side facing the connecting region and the two end faces run at right angles in relation to the longitudinal axis of the glass component. However, it may be advantageous for the glass component to form a convex end face on its side facing the receiving region and/or an end face that is beveled with respect to the longitudinal axis of the glass component on its side facing the connecting region. The glass component is in this case preferably formed as a cylindrical glass component.

A convex formation of the end face toward the optical fiber makes improved securement of physical contact possible with respect to the end face of an optical fiber. An alignment of the other end face obliquely in relation to the longitudinal axis of the glass component has the effect of minimizing reflections back into the fiber.

The glass component preferably has a refractive index that is adapted to the refractive index of an inserted optical fiber. This allows reflection back of the light emerging from the optical fiber to be further reduced.

The coupling unit is preferably formed in one piece—apart from the glass component, in particular as an injection molding. The formation of the coupling unit as an injection molding makes particularly inexpensive production possible.

The connecting region of the coupling unit is preferably formed substantially cylindrically and preferably serves for the connection of the coupling unit to a transmitting and/or receiving module which is arranged in a TO package. The coupling unit is preferably adjusted and adhesively bonded securely with respect to the TO module. For this purpose, latching elements and passive adjusting elements may be provided. Subsequently, a ferrule with an optical fiber is preferably introduced into the receiving region of the coupling unit.

BRIEF DESCRIPTION OF THE DRAWINGS

The invention is explained in more detail below on the basis of an exemplary embodiment with reference to the figures, in which.

DESCRIPTION OF A PREFERRED EXEMPLARY EMBODIMENT

Figure 1:
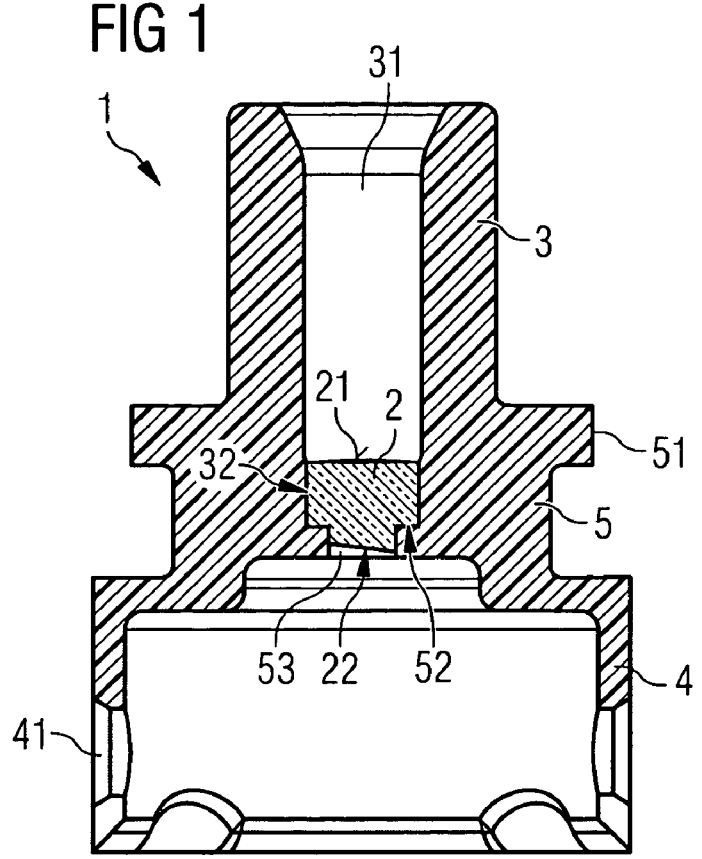
FIG. 1 shows a sectional view of a coupling unit for coupling an optical transmitting and/or receiving module to an optical fiber connector, the coupling unit having a cylindrical glass component.

FIG. 1 shows a coupling unit 1 with a receiving region 3, a connecting region 4 and a cylindrical glass component 2. The coupling unit 1 is formed as a one-piece injection molding—apart from the glass component 2.

The receiving region 3 is formed as an elongate sleeve, which provides a precision bore 31 for a connector ferrule with a central single-mode glass fiber (not represented) to be introduced into the elongate sleeve 3. The end face of such a glass fiber is in this case polished together with the end face of the connector ferrule such that it is convex perpendicularly in relation to the radiating direction or longitudinal axis of the glass fiber.

The precision bore 31 is axially adjoined by a further bore 32, in which the glass component 2 is arranged. The bore 32 for receiving the glass component 2 has in this case a slightly smaller diameter in comparison with the precision bore 31. For example, the diameter of the bore 32, which receives the glass component 2, is smaller than the diameter of the precision bore 31 by approximately 100 μm. This allows the glass component 2, which likewise has a slightly smaller diameter in comparison with the precision bore 31, to be introduced into the precision bore 31 and introduced through the latter into the bore 32 without the precision bore 31 being damaged in the process.

The cylindrically formed connecting region 4 of the coupling unit 1 serves for receiving and coupling on a TO standard module, which comprises an optical transmitting unit, in particular a laser diode, and/or an optical receiving unit, in particular a photodiode, contained in a TO package. Instead of a TO module, other types of module may also be arranged in the connecting region 4, in which case it would be necessary for the form of the connecting region 4 to be adapted to the corresponding type of construction.

By means of the connecting region 4, the coupling unit 1 is adjusted with respect to a TO module to be coupled on and is adhesively bonded securely to the latter. Provided for this purpose in the connecting region 4 is an opening 41, through which an adhesive can be introduced into the intermediate space between the connecting region 4 and the package of the TO module. The adjustment of the coupling unit 1 with respect to the TO module may take place actively or alternatively by means of passive adjusting marks.

Between the receiving sleeve 3 and the cylindrical connecting region 4 for the coupling on of a TO module there lies a central region 5, which has on its outer side structures 51 for being received in a transceiver housing. The central region 5 may in this case also be regarded as part of the receiving sleeve 3.

The cylindrical glass component 2 is led through the precision bore 31 and pressed or cemented into the further bore 32 of reduced diameter. A stop 52 at the end of the bore 32 toward the connecting region 4 ensures reliable positioning and securement of the glass component 2 in the plastic part.

It is pointed out that, without the glass component 2, a continuous opening would exist between the bore 31 of the sleeve 3 and the connecting region 4. So, the central region 5 has a clearance 53 adjacent to the stop 52.

The cylindrical glass component 2 has a first end face 21, toward the receiving sleeve 3, and a second end face 22, toward the connecting region 4.

The first end face 21 may in this case be formed convexly to ensure a good direct contact (physical contact) between the first end face 21 and the end face of a ferrule and optical fiber introduced into the receiving sleeve 3. This is shown somewhat enlarged in FIG. 2. However, the first end face 21 may also be formed in a planar manner.

Figure 2:
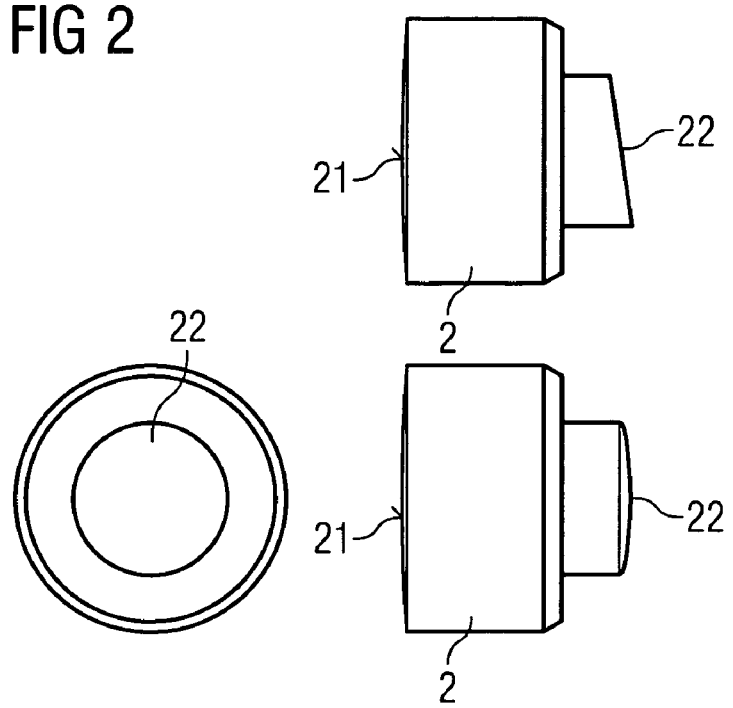
FIG. 2 shows several views of a configurational variant of the glass component of FIG. 1.

The second end face 22 preferably has an obliquity. As a result, reflections back into the optical fiber to be coupled on are minimized. Such an obliquity is represented in FIG. 2, which shows the glass component in a plan view and two side views turned by 90°. As represented in FIG. 1, the end face 22 protrudes somewhat into the clearance 53 of the central region 5.

Alternatively, no obliquity of the second end face 22 is provided. It may then also be provided that the second end face 22 protrudes somewhat into the clearance 53, the end face in this case forming a projection. An obliquity is not required in particular whenever the distance between the two end faces 21, 22 is so great that the reflections back into the fiber are in any case small. This is the case in particular with a distance between the end faces 21, 22 of more than 1 mm.

The glass component 2 has a refractive index that is adapted to the refractive index of an optical fiber inserted into the sleeve 3 and lying with its end face against the stop face 21. This minimizes reflections at the end face of the optical fiber to be coupled on.

Direct coupling of light between an optical fiber inserted into the receiving sleeve 3 and a transmitting and/or receiving unit of a module which is fixed to the connecting region 4 takes place via the glass component 2. The use of an additional optical fiber, cemented into the coupling unit, is not required. Use of a glass component means that there is no risk of scratching or other damage which would impair the light coupling.

The invention is not confined in its execution to the exemplary embodiment represented above. A person skilled in the art recognizes the existence of numerous alternative configurational variants which, in spite of their departure from the exemplary embodiments described, make use of the teaching defined in the claims which follow.

For example, coupling may take place with a transmitting and/or receiving module which is formed in other types of construction than the TO type, the connecting region 4 then being configured correspondingly differently. Generally, the connecting region may have any form that allows some connection or other with a transmitting and/or receiving module. For example, it may merely be a planar bounding surface which can be adhesively bonded to a transmitting and/or receiving module.

Furthermore, the exact form of the glass component and its position in the plastic part are also to be understood as given only by way of example. Alternatively, the glass component may also be configured for example as a cuboid and/or be arranged in a lateral press hole of the plastic part.

I claim:

1. A coupling unit for coupling an optical transmitting and/or receiving module to an optical fiber connector, the coupling unit comprising:

a connecting region for connecting to the transmitting and/or receiving module, a receiving region for receiving the optical fiber connector, and a glass component, via which light is coupled directly between the optical fiber inserted into the receiving region and the transmitting and/or receiving module, wherein the coupling unit is formed as a plastic part apart from the glass component, wherein the glass component is introduced into a bore in the plastic part, wherein the receiving region is formed for receiving a ceramic ferrule which centrally contains an optical fiber to be coupled on, and wherein the glass component comprises a first cylindrical portion on a side facing the connecting region and a second cylindrical portion on a side facing the receiving region, the first cylindrical portion being smaller in diameter than the second cylindrical portion.

2. Coupling unit according to claim 1, wherein the receiving region forms a bore for receiving the optical fiber connector and the bore for receiving the glass component axially adjoining the bore for receiving the optical fiber connector and at the same time having a slightly smaller diameter than the latter.

3. Coupling unit according to claim 2, wherein the plastic part forms a stop at the end of the bore for receiving the glass component toward the connecting region.

4. Coupling unit according to claim 1, wherein the glass component comprises a planar end face on the side facing the receiving region, and a planar end face on the side facing the connecting region, and wherein the two end faces extend at right angles in relation to the longitudinal axis of the glass component.

5. Coupling unit according to claim 1, wherein the glass component forms a convexly formed end face on its side facing the receiving region.

6. Coupling unit according to claim 1, wherein the glass component comprises a refractive index that is adapted to the refractive index of an inserted optical fiber.

7. Coupling unit according to claim 1, wherein the plastic part is formed as an injection molding.

8. Coupling unit according to claim 2, wherein the receiving region is formed as an elongate sleeve with a precision bore.

9. Coupling unit according to claim 1, wherein the connecting region is formed for connection to a transmitting and/or receiving module which is arranged in a TO package.

10. Coupling unit according to claim 1, wherein the glass component is pressed into the bore.

11. Coupling unit according to claim 1, wherein the glass component is adhesively cemented into the bore.

12. A coupling unit for coupling an optical transmitting/receiving module to an optical fiber connector such that optical signals can be passed between the optical transmitting/receiving module and the optical fiber connector, the coupling unit comprising:

an integrally-molded plastic part including:

a receiving sleeve for receiving the optical fiber connector such that a glass fiber of the optical fiber connector is aligned in a first bore defined by the receiving sleeve, and such that an end face of the glass fiber is located at an end of the first bore, a connecting structure for coupling the transmitting/receiving module such that a transmitting/receiving element of the transmitting/receiving module is located inside a connecting region defined by the connecting structure, and a central structure located between the receiving structure and the connecting structure, the central structure defining a second bore defining a passage between the first bore and the connecting region; and a glass component fixedly mounted with an adhesive cement in the second bore, at least a portion of the glass component having an outside diameter substantially the same as an inside diameter of the second bore, the glass component including a first end face located proximate the end of the first bore, and a second end face protruding into a clearance between the second bore and the connecting region, and the glass component being located such that, when the transmitting/receiving module is mounted in the connecting structure, said optical signals can be passed between the transmitting/receiving element and the second end face of the glass component.

13. Coupling unit according to claim 1, wherein the receiving region forms an inwardly tapered bore for receiving the optical fiber connector.

14. Coupling unit according to claim 1, wherein the glass component includes a cylindrical portion via which the light is coupled and that protrudes into the connecting region.

15. Coupling unit according to claim 1, wherein the glass component forms an end face that is beveled with respect to the longitudinal axis of the glass component on its side facing the connecting region.

16. Coupling unit according to claim 2, wherein the diameter of the bore for receiving the glass component is approximately 100 μm smaller than the diameter of the bore for receiving an optical fiber connector.

* * * * *